United States Patent [19]

Legrand et al.

[11] 4,412,774
[45] Nov. 1, 1983

[54] APPARATUS FOR THE INSTALLATION OF A JET ENGINE IN AN AIRCRAFT COMPARTMENT

[75] Inventors: Paul J. Legrand, Vaux le Penil; Andre R. Notheaux, Palaiseau; Guy R. Pachomoff, Corbeil-Essonnes; Alexis M. G. Romanoff, Cesson, all of France

[73] Assignee: Societe Nationale d'Etude et de Construction de Moteurs d'Aviation, "S.N.E.C.M.A.", France

[21] Appl. No.: 244,311

[22] Filed: Mar. 16, 1981

[30] Foreign Application Priority Data

Mar. 19, 1980 [FR] France ............................... 80 06102

[51] Int. Cl.³ ........................................... B66F 19/00
[52] U.S. Cl. ................................. 414/589; 180/298; 244/54; 248/554; 248/671
[58] Field of Search ............. 414/589, 590; 244/53 R, 244/54; 248/544, 554, 671; 180/298, 294

[56] References Cited

U.S. PATENT DOCUMENTS 2,940,769 6/1960 Taylor ........................... 414/590 X
3,979,087 9/1976 Paul ................................ 248/554 X Primary Examiner—Douglas C. Butler
Assistant Examiner—Donald W. Underwood
Attorney, Agent, or Firm—Bacon & Thomas

[57] ABSTRACT

A dolly for use in the installation of a jet engine in an aircraft compartment. The dolly has longitudinal guide rails placed in the compartment and a device including two lateral guide rails and a lower, median guide rail; a foldable and removable front cradle carrying two runners and capable of being attached to the front of the engine, the runners cooperating with the lateral guide rails; a rear cradle that is removable and equipped with a runner cooperating with the lower median guide rail; a frame to which the lateral guide rails are adjustably attached; means for the vertical displacement and the longitudinal displacement of the frame.

14 Claims, 13 Drawing Figures

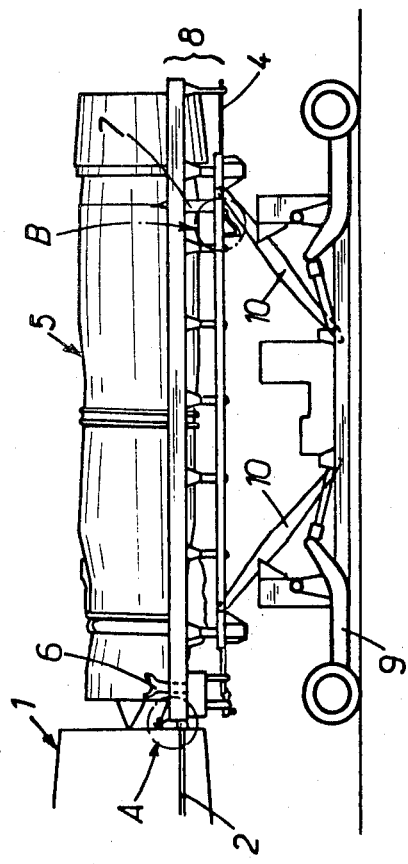
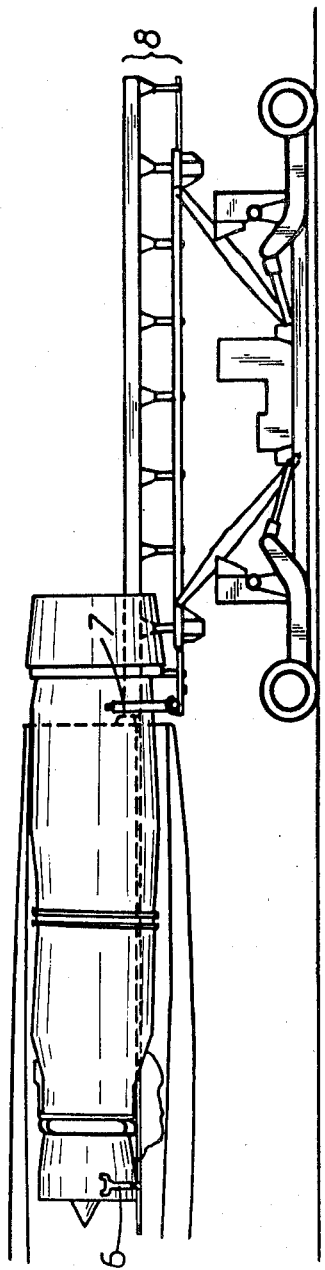
FIG. 1
FIG. 2

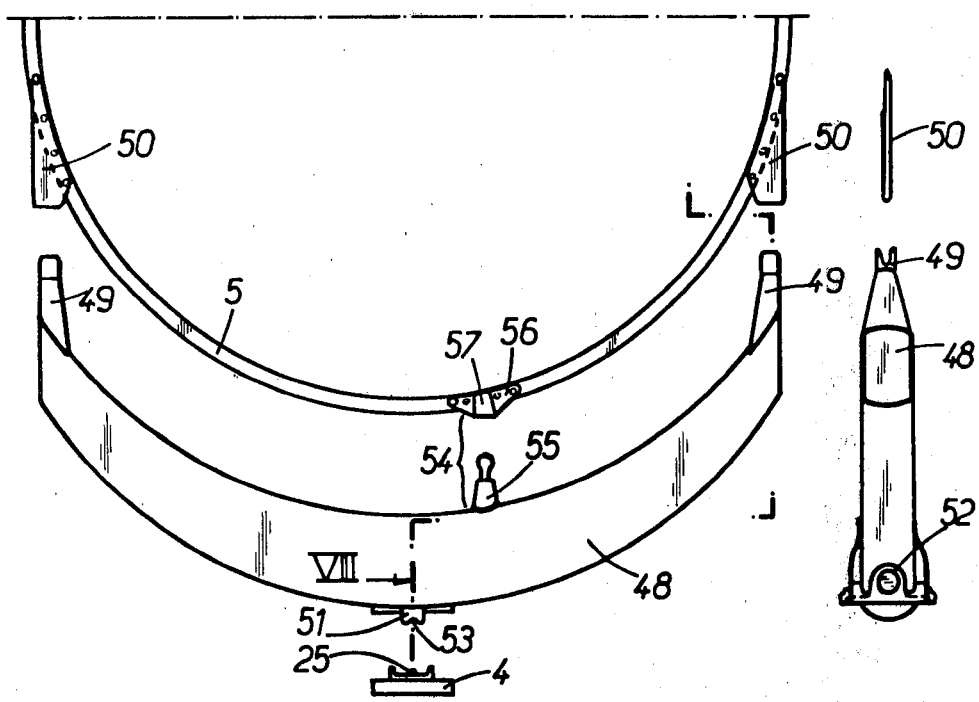
FIG. 7
FIG. 8
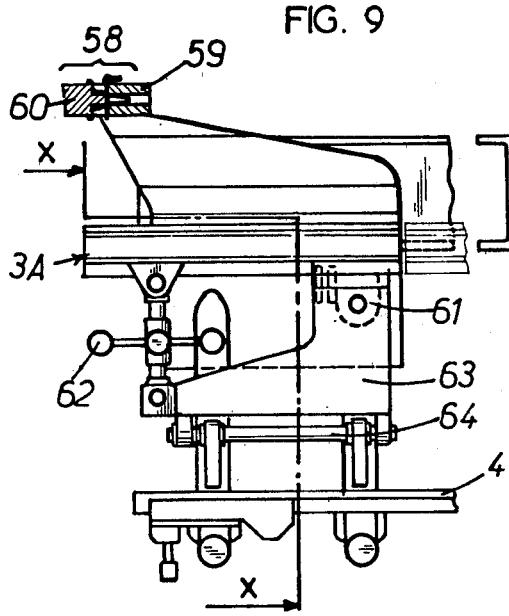
FIG. 9
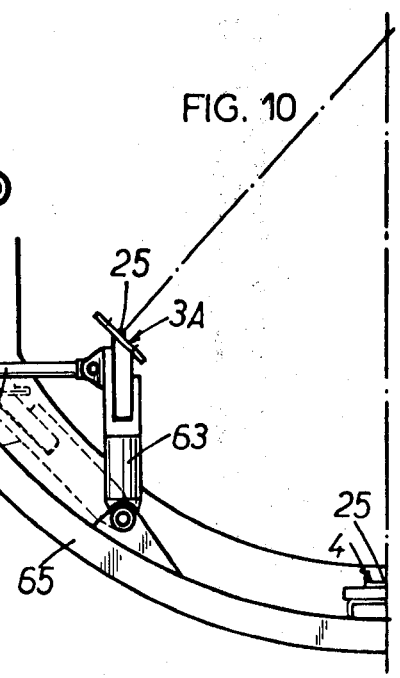
FIG. 10

# 4,412,774

APPARATUS FOR THE INSTALLATION OF A JET ENGINE IN AN AIRCRAFT COMPARTMENT

BACKGROUND OF THE INVENTION

The invention concerns a device for use in the installation of a jet engine in a compartment of an aircraft, said compartment containing a plurality of guide rails which cooperate with the rollers supporting the jet engine.

The installation of the engine in a military aircraft is generally effected by means of four rollers, mounted on the engine and rolling on two rails attached to the compartment. This system requires rigorous control of the distance between centers of the rollers and of the parallelism of the rails, in order to prevent any jamming or derailment during the handling of the engine.

The weight of the rails, the rollers and the reinforcing pieces is relatively large and reduces the useful load of the aircraft.

French patent No. 1,216,234 describes a device for the installation and removal of a jet engine, capable of being mounted on the transport vehicle of an aircraft. This device consists of a system of braces maintaining two rails, with the end thereof fastened directly in the box of the aircraft compartment. The rails constitute a track for the rollers mounted on suspension studs of the engine. The braces support further a third, center rail which serves as a guide for two runners, each secured to a stirrup mounted for the purpose in front and at the rear of the engine. No indication is given concerning the installation of the stirrups and the time of their use during the movements of the engine. As the lateral rails and the center rail are adjacent only over a small portion of their length, the front stirrup appears to have a supporting role only when the engine is in its farthest position from the compartment. Only the rear stirrup serves as a guide when the engine is removed from or installed in the compartment. The rollers cooperating with the lateral rails are mounted on the mounting studs of the engine each time the latter is to be moved. Between the ends of the studs and the walls of the compartment, sufficient space must be provided for the placement of said rollers.

SUMMARY OF THE INVENTION

It is the object of this invention to provide an apparatus of a type comparable to that described in the above-cited patent, but capable of guiding and supporting the engine during the entirety of its movements without the need for a hoisting gear. The apparatus also permits a reduction in the weight of the guide rails provided in the compartment and the space between the nacelle and the engine.

The device for the installation of a jet engine in a compartment of an aircraft, according to the present invention, comprising inside a plurality of longitudinal guide rails capable of cooperating with runners supporting the engine, is characterized in that it comprises at least means to move and to place the engine, including at least two lateral guide rails and a lower median guide rail; a flexible front cradle that is removable and carries at least two rolling elements, capable of being attached to the front of the engine, said elements cooperating with the two lateral guide rails and longitudinal guide rails mounted in the compartment; a removable rear cradle equipped with rolling elements, capable of being attached to the rear of the engine, said elements cooperating with the lower median guide rail; a frame to which the lateral and the median guide rails and rail are variably attached; means for the vertical displacement of the frame; means for the longitudinal movement of the frame.

BRIEF DESCRIPTION OF THE DRAWINGS

The explanations and figures given hereinafter as examples will aid in the comprehension of the embodiment of the invention.

FIG. 1 shows an embodiment of an apparatus for the installation of a jet engine in a compartment of an aircraft, the engine being shown behind the compartment;

FIG. 2 shows the introduction of the engine into the compartment;

FIG. 7 is a view of the rear cradle;

FIG. 8 is a side elevational view of the members of FIG. 7;

FIG. 9 is a large scale view of detail A of FIG. 1;

FIG. 10 is a view on line X—X of FIG. 9;

DESCRIPTION OF THE PREFERRED EMBODIMENTS

Figure 3:
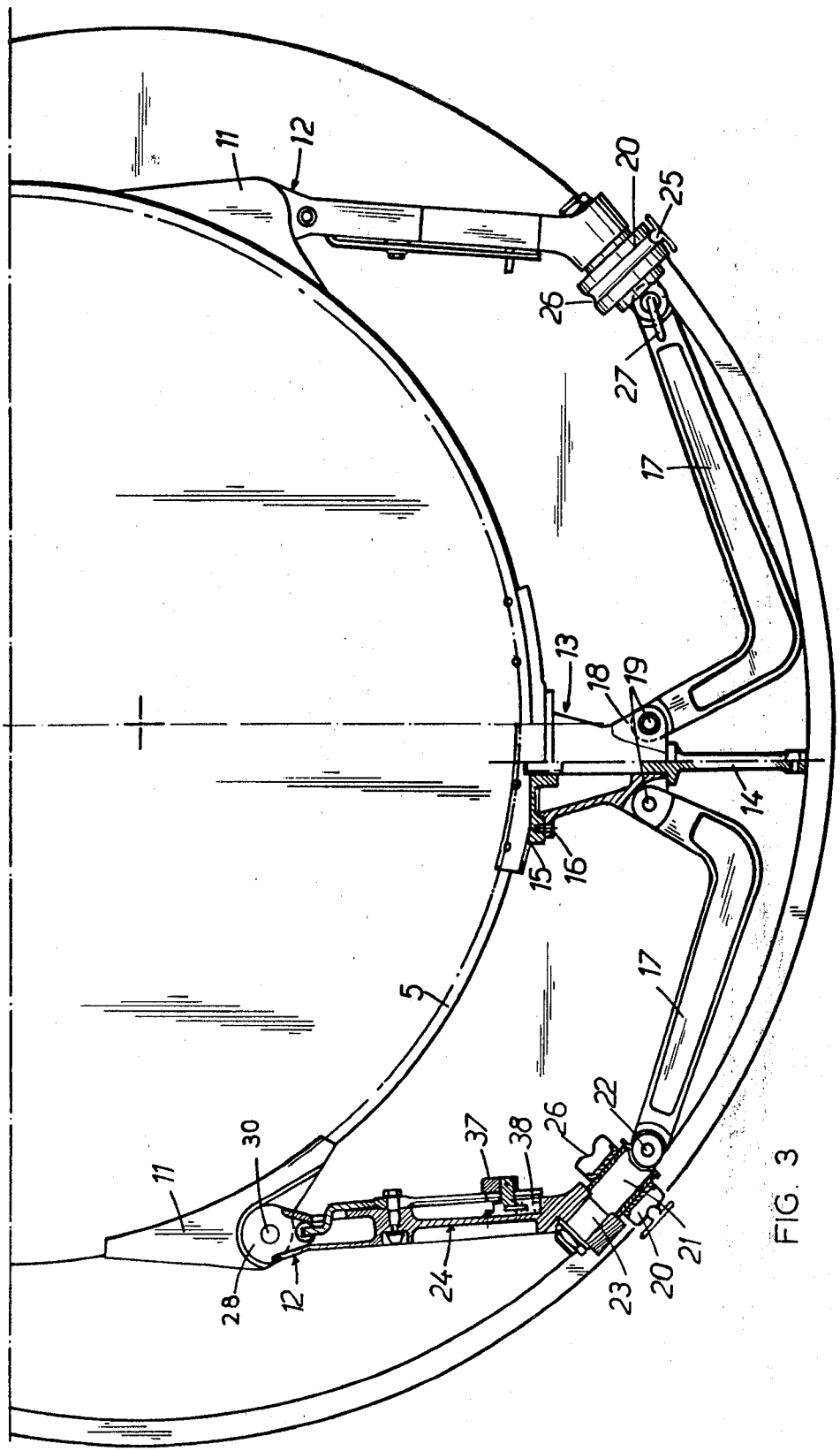
FIG. 3 is a partial vertical sectional view of the front cradle of the apparatus.

FIG. 1 shows an apparatus for the installation of a jet engine in an aircraft compartment. The apparatus is joined with the compartment 1 which has within it two longitudinal guide rails 2. The apparatus comprises means for the insertion and placement of the engine, including two lateral guide rails 3 (shown partially at 3A in FIGS. 9 and 10) and a median guide rail 4. The engine 5 is supported on two cradles: a flexible and removable front cradle 6 carrying two roller elements capable of cooperating with the lateral rails 3, and a rear cradle 7, that is removable and carries a roller element capable of cooperating with the median rail 4. The rails 3, 4 are mounted in an adjustable manner on a frame 8 which is carried by the means for longitudinal displacement, forming the dolly. The dolly also comprises means 10 for the vertical displacement of the frame. These means make it possible to adjust with precision the height of the frame to align, in the vertical direction, the rails mounted in the compartment of the aircraft with those carried by the frame. Members 9 and their wheels constitute means for the longitudinal displacement of the frame.

Figure 4:
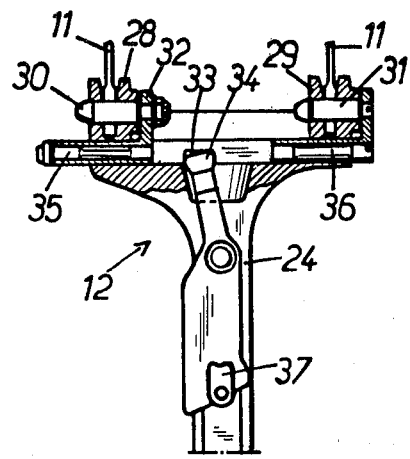
FIG. 4 is a sectional view of an embodiment of the provisional means of fastening of the front cradle.

According to the embodiment of the front cradle shown in FIG. 3, it is attached to fittings 11 on the casing of the engine by means of the provisional fastening device 12, which are shown in more detail in FIG. 4 and shall be described hereinbelow.

The front cradle comprises a center piece 13 capable of being attached by means of a threaded pin 14 to the engine casing 5 and more particularly to a support 15 integral with the casing. The centering of the piece 13 on the support 15 is assured by a pin 16. Two arms 17, placed symmetrically with respect to the axis of the piece 13, are articulated on the center piece at one of their ends cooperating with cap 18, traversed by pivot pins 19. The arms are thus movable in a diametrical plane of the engine. A roller element 20, rotatable on the axle 21, is hingedly attached by means of a pivot pin 22, to the other end of the arms 17; further the roller element 20 is free to slide axially on one end of the pivot pin 21. This arrangement permits the correction of errors in alignment and the deformations of the two guide rails. The other end of the pivot pin 21 defines the axis of rotation 23 of the lowerable support 24 comprising the provisional fastening means 12, which cooperate with the fittings 11 of the casing.

According to a preferred embodiment of the invention, the rails of the apparatus for the installation of the engine and those mounted in the compartment consist of sections having at least one rail flange 25. The flange cooperates with a groove 26 provided in the roller element 20. In order to prevent the lateral deformation of the cradle which would lead to the derailment of the runners during the movement of the engine, blocking means 27 are provided on the axles 22. The fastening means 12 placed at the upper end of the support 24 consist schematically of at least one strap 28 cooperating with the fitting 11 fastened to the engine casing, and a pin 30 passing through the strap and the fitting. According to the embodiment shown in FIG. 4, the upper end of the support 24 carries member 32 in the form of a fork equipped with a trigger 34, securing the support to the fittings 11 of the casing. The head of the bolt comprises two straps 28 and 29 into which the fittings 11 of the casing are positioned. The straps have a bore into which the locking pins 30 and 31 project. The pins are rigidly mounted on the fork 32. The fork has a recess 33 engaged by the trigger 34 and two cylindrical portions 35 and 36 which slide in bores provided in the bolt. The trigger 34 is immobilized on the body of the support 24 by means of a block 37, which locks into a notch of the trigger under the pressure of a spring 38. The fork, which is rigid with the pin, the trigger and the blocking means of the trigger constitute a safety device to maintain the temporary fastening means 12 in place.

Figure 5:
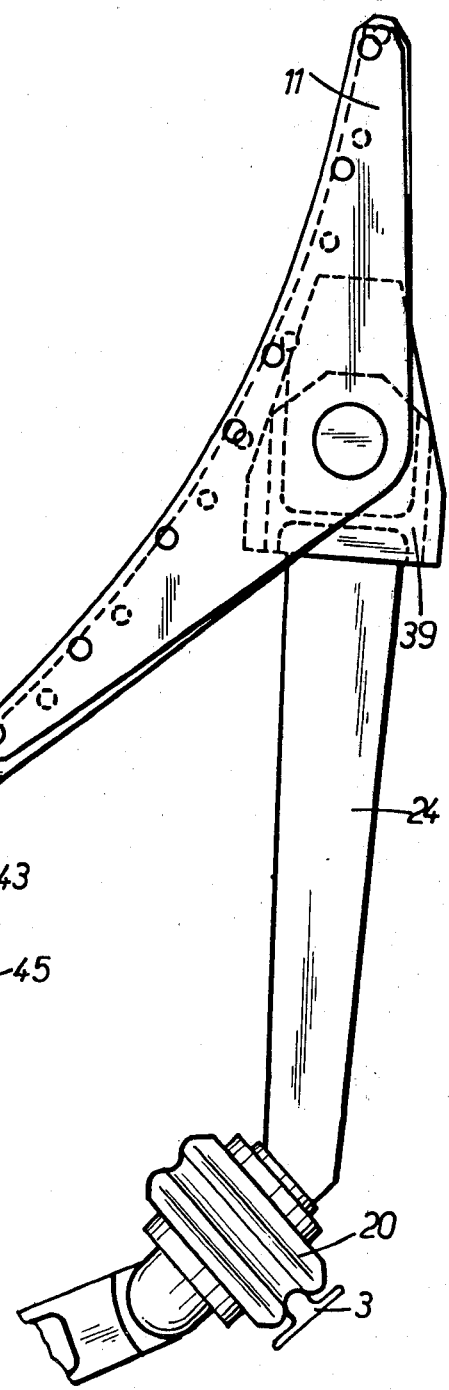
FIG. 5 is another embodiment of the provisional fastening means for the front cradle.
Figure 6A:
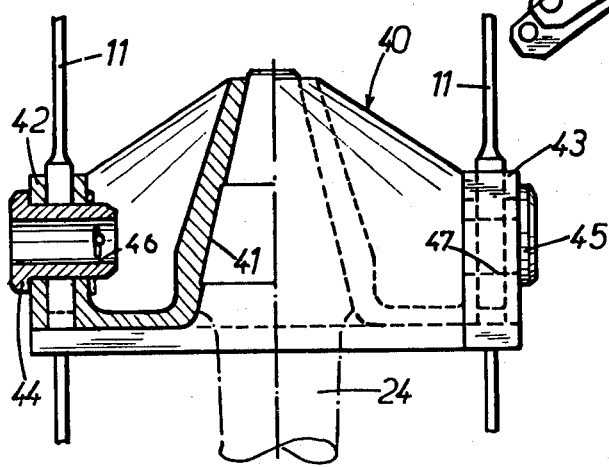
FIGS. 6a and 6b are, respectively, a view in partial section and a top view of the means of fastening according to FIG. 5.
Figure 6B:
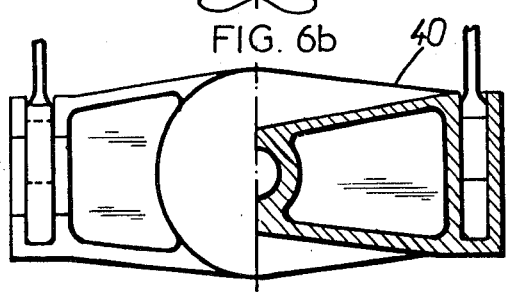

According to another embodiment of the temporary fastening means, according to the invention shown in FIGS. 5, 6a and 6b, the upper end of the support 24 carries a conical male tip 39, capable of entering a piece 40 having a cavity 41 of a corresponding female conical shape. The piece 40 has on either side of the cavity 41 straps 42 and 43, which receive the fittings 11 mounted on the casing of the engine 5. The pins 44 and 45 are placed in bores 46 and 47 provided in the straps 42 and 43, to retain the fittings 11 therein.

The rear cradle 7 (FIG. 1), shown in detail in FIG. 7, consists of a curved frame 48, carrying at its ends the support means 49, shown in side elevation in FIG. 8, wherein the fittings 50 attached to the casing of the engine 5 are placed. The cradle carries at its lower part a roller element 51 which rotates in a strap 52 attached to the frame. The roller element is, in the present embodiment, a runner having a center groove 53. This groove cooperates with a flange 25 of the median rail 4. According to a preferred embodiment, the rails 3 and 4 are of U-section having a median flange. This shape provides a dual guidance for the runners and a ready adjustment to the rails mounted in the compartment.

In order to maintain the cradle in a desired position, a temporary fastening device 54 is provided, said device consisting of a column with a spherical head 55 mounted on the upper face of the frame 48, in a position close to its plane of symmetry and a piece 56 secured to the casing of the engine 5, and having a conical recess 57.

When the apparatus is placed in front of the entry of the compartment 1, wherein the engine is to be housed, the frame is raised to an appropriate height by the means 10 for vertical displacement and is firmly joined to the compartment by means of the locking device 58 (FIG. 9). The latter means consist, for example, of an at least partially cylindrical socket 59, into which a tip 60, on the compartment, penetrates. The tip is maintained in the socket by a pin passing through both.

In order to obtain an accurate relative positioning of the rails of the frame and those of the compartment, means for the adjustment of each of the two lateral rails are provided. FIGS. 9 and 10 show these adjusting means.

According to the embodiment shown, the lateral rails 3 have two independent sections in front of 3A. Each section is articulated in a sliding strap 61 and may be adjusted in height by the bolt 62. The rail section 3A and the bolt 62 are supported by an angle brace 63, that is pivoted on an axle 64 mounted on cross-bars 65 and maintained in position by a T handle 66. The brace 63 and the handle 66 take the position shown by the broken line in FIG. 10.

Figure 11:
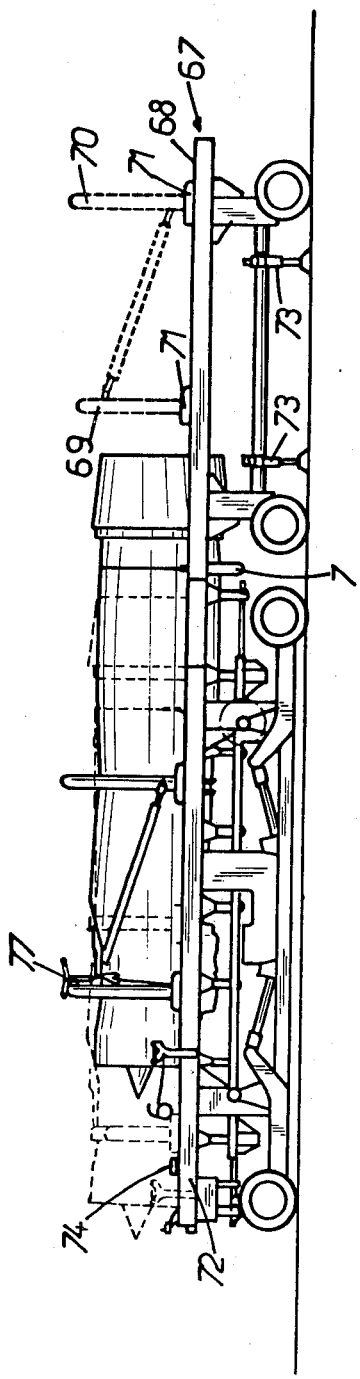
FIG. 11 is an over-all view of the transport dolly.

In the particular form shown, the engine may be placed on the installation apparatus by a hoist or it may be pushed onto the device from a transport carriage (FIG. 11). The transport carriage 67 consist of a frame, two horizontal beams of which form a rolling track 68. The suspension arches 69 and 70 carry rods connected with the normal points of attachment of the engine. The feet of the members supporting the arches are equipped with roller means 71, moving on the roller track 68.

In order to permit the displacement of the engine attached to the cradles and its placement on the dolly, the latter is equipped with two rolling rails consisting of the horizontal beams of the frame 8 (FIG. 1).

The transport carriage may be equipped with bolts to facilitate the proper alignment of the rails of the transport carriage and of the dolly.

The process of the placing of the engine using the apparatus, is described hereinafter.

The dolly comprising the apparatus that is the object of the invention is brought to the rear of the aircraft and locked to the latter by means of the device 58 (FIG. 9). The height of the bottom of the frame 8 is adjusted by the vertical displacement device 10. The accurate alignment of the rails of the compartment with the lateral rails 3 of the dolly is obtained by adjusting the section 3A with the aid of the member 62.

The transport carriage 67 is coupled with and locked to the dolly (FIG. 11) by a device known in itself. The roller track 68 of the transport carriage is placed into an extension of the roller track 72 of the dolly by the bolts 73 which also secure it in place. The engine, suspended from the arches 69 and 70, is pushed onto the dolly to the stops 74.

Figure 12:
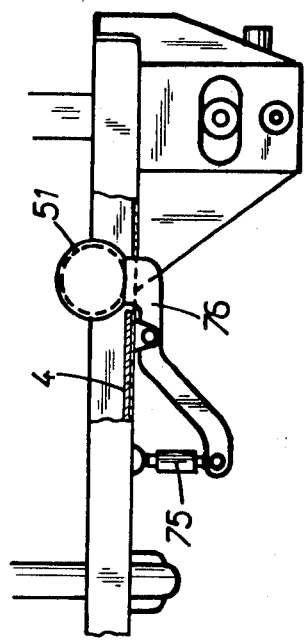
FIG. 12 is a large scale view of detail B of FIG. 1.

By means of the bolt 77 or adjustable rods securing the engine to the arch 69, the rollers 20 of the cradle 6 may be guided onto the lateral rails 3. Similarly, the bolt 75 (FIG. 1, detail B and FIG. 12) places the lever 76 in contact with the roller 51 of the rear cradle 7 and supports temporarily the rear of the engine while the rods connecting it with the support arch 70 are disconnected. The bolt 75 is then actuated to guide the end of the lever 76 to the height of the rail 4. The bolt and its lever constitute an adjustable hoisting device.

One then proceeds to transfer the engine into the compartment.

The front end of the rails 3A of the articulated section of the rails 3 being in accurate alignment with those of the compartment (by acting on the bolt 62, FIG. 9), the engine is pushed inside the aircraft (FIGS. 1 and 2). The articulated device is lowered laterally to permit the passage of the rear cradle 7.

When the engine comes to rest on the installation rails within the compartment, it is located a few millimeters under its normal position. It is raised in position in front and rear by means of a device, not shown, (articulated rail, bolt, cam controlled rod, removable bracket, etc.).

The removable cradles are then disassembled through access ports.

The removal of the engine is effected in the same manner in an inverse order of operations.

It should be understood that the description hereinabove and the drawings attached hereto show merely an example of the apparatus according to which the invention may be embodied and that the scope of the invention would not be exceeded by the substitution of equivalent means, particularly by the integration of the functions of the transport carriage and the dolly into a single carriage.

We claim:

1. Apparatus for the installation of a jet engine having a casing in an aircraft compartment comprising: a plurality of longitudinal guide rails in said compartment capable of cooperating with a plurality of runners supporting said engine, said apparatus being characterized by that it comprises at least means for the displacement and placing of the engine including at least two lateral guide rails (3) and a median, lower guide rail (4); a foldable and removable front cradle (6) carrying at least two roller elements (20), capable of being attached to the front of the engine casing, the two roller elements cooperating with the two lateral guide rails (3) and the longitudinal guide rails (2) mounted inside the compartment; a removable rear cradle (7) equipped with a roller element (51), capable of being attached to the rear of the engine casing, said element cooperating with the lower median guide rail (4); a frame (8) to which at least the lateral guide rails are adjustably attached; means (10) for the vertical displacement of the frame (8); means for the longitudinal displacement (9) of the frame (8).

2. Device according to claim 1 wherein the front cradle (6) comprises a center piece (13) capable of being attached to the casing of the engine (5), by means of a pin (14), two arms (17) each hingedly attached at one of their ends to the center piece symmetrically with respect to the axis of said piece; a roller element (20) mounted on an axle (21), the one end (22) whereof is hingedly attached to the other end of the arm (17) and mobile in the same diametrical plane as the arms, and the other end (23) whereof constitutes the axle of rotation of the end of a support (24) comprising temporary fastening means (12) to the fittings (11) mounted on the casing of the engine (5).

3. Apparatus according to claim 2 wherein the temporary fastening means (12) provided on the free end of the support, comprise at least a strap (28, 29) cooperating with a fitting (11) mounted on the engine casing (5), and a pin (30, 31) passing through the straps and the fitting to ensure their attachment.

4. Apparatus according to claim 2 wherein the temporary fastening means (12) consist of a conical tip (39) fastened to the free end of the support (24) and a piece (40) having a cavity (41) of a shape complementing that of the tip, mounted on at least one fitting (11) attached to the engine casing (5) by means of the axles (44, 45).

5. Apparatus according to claim 3 wherein the temporary fastening means (12) comprise a safety device consisting of a fork (32) integral with said pin (30, 31), a trigger pivoted to said support (24), one end of which extends into a recess (33) provided in the fork (32) and a blocking means (37) for preventing pivotal movement of the trigger on the support.

6. Apparatus according to claim 1 wherein the rear cradle (7) consists of a curved frame (48) carrying at each end support means (49), wherein the fittings (50) mounted on the engine casing (5) are placed; a roller element (51) provided on the bottom part of the frame and capable of cooperating with the median guide rail (4); and a temporary fastening device (54) for removably securing the cradle to the casing of the engine (5).

7. Apparatus according to claim 6 wherein the temporary fastening means (54) consist of a column (55) with a spherical head, mounted on the upper face of the frame (48) and close to the plane of symmetry, cooperating with a recess (57) provided in the casing (5).

8. Apparatus according to claim 1 wherein the apparatus for the installation of the engine includes locking means (59) cooperating with complementary means (60) attached to the compartment (1).

9. Apparatus according to claim 1 wherein the two lateral guide rails (3) are on an independent section (3A), that is articulated and adjustable in height relative to said apparatus.

10. Apparatus according to claim 1 wherein the frame (8), to which the guide rails are attached, carries on its upper part the roller tracks (72), upon which suspension arches (69, 70) of the engine are capable of moving, to transfer said engine from a transport carriage (67) to the apparatus for its installation.

11. Apparatus according to claim 1 wherein the rails (2; 3; 3A; 4) have, along their longitudinal axes, a semi-cylindrical flange (25).

12. Apparatus according to claim 1 wherein the lateral guide rails (3) and the median guide rail (4) are U sections with a median flange (25).

13. Apparatus according to claim 1 wherein the roller elements (20, 51) have cylindrical surfaces comprising in a median transverse plane a groove (26, 53) with a rounded bottom.

14. Apparatus according to claim 1 wherein an adjustable hoisting device (75, 76) is provided as an extension of and at the rear of the median guide rail.

* * * * *